United States Patent [19]
Yu

[11] Patent Number: 5,458,054
[45] Date of Patent: Oct. 17, 1995

[54] BARBECUE GRILL ASSEMBLY

[76] Inventor: Ali Yu, No. 324, Alley 52, Lane 46, Sec. 2, Yuanta Rd., Yuanlin Chen, Changhua Hsien, Taiwan

[21] Appl. No.: 387,237

[22] Filed: Feb. 13, 1995

[51] Int. Cl.⁶ .................................................. A47J 37/07
[52] U.S. Cl. .................. 99/446; 99/449; 99/450; 126/25 A; 126/9 B
[58] Field of Search ............... 99/339, 340, 375, 99/400, 425, 444–446, 447, 449, 450, 482; 126/25 R, 25 A, 41 R, 9 R, 9 B, 3 D

[56] References Cited

U.S. PATENT DOCUMENTS

| | | | |
|---|---|---|---|
| 974,828 | 11/1910 | Rollins | 99/449 |
| 4,481,408 | 11/1984 | Scheufler | 99/450 |
| 4,694,816 | 9/1987 | Fabbro | 126/41 R |
| 4,724,753 | 2/1988 | Neyman et al. | 126/25 A |
| 4,762,059 | 8/1988 | McLane, Sr. | 99/400 |
| 5,076,155 | 12/1991 | Golob | 99/446 |
| 5,097,753 | 3/1992 | Naft | 99/450 |
| 5,176,067 | 1/1993 | Higgins | 99/340 |
| 5,199,347 | 4/1993 | Chen | 99/450 |
| 5,211,105 | 5/1993 | Liu | 126/9 R |
| 5,303,691 | 4/1994 | Armistead | 126/25 A |
| 5,359,988 | 11/1994 | Hait | 99/446 |

*Primary Examiner*—Timothy F. Simone
*Attorney, Agent, or Firm*—Sixbey, Friedman, Leedom & Ferguson

[57] ABSTRACT

A barbecue grill assembly includes a first bowl, a second bowl disposed on the first bowl, a grate disposed on the second bowl, a bolt and a crank. The first bowl has a first bottom and a first skirt, a central tube extending from the first bottom thereof and two first slots are defined in a periphery of the central tube and each disposed diametrically opposite in the central tube, a second slot is defined in the first skirt. The second bowl has a second bottom and a second skirt, the second bottom for charcoal disposed thereon has a central hole and a plurality of vents defined therein and a long tube has a first end having a receiving hole defined therein for a stud extending downwardly from the grate inserted therein and a second end inserted in the central tube, the second end of the long tube has a U-shaped tunnel defined therein such that the bolt extends through the second slot, the first slots and the U-shaped tunnel to engage to a nut. The crank is engaged between two engaging holes defined in the first skirt and is disposed between the bolt and the first bottom of the first bowl such that a distance from the second bottom of the second bowl to the grate is adjusted by rotating the crank.

4 Claims, 4 Drawing Sheets

5,458,054

BARBECUE GRILL ASSEMBLY

BACKGROUND OF THE INVENTION

The present invention relates to a barbecue grill assembly and more particularly, to a barbecue grill having a control device to adjust a distance of a grate of the grill by rotating a handle connecting to the control device.

Generally, a conventional barbecue grill assembly provides only a feature of dealing food disposed on a grate of the grill by a heat source, charcoal for example disposed in a bowl of the grill assembly, however, the distance from the charcoal to the grate is fixed during grilling, therefore, food grilled on the grate perhaps receives a too high temperatures in the period when the new charcoal is heated, but receives a lower temperature when the charcoal has been burning for a period of time.

The present invention intends to provide a barbecue grill assembly which has a control device to adjust a distance from the grate on which food disposed to a heat source to mitigate and/or obviate the above-mentioned problems.

SUMMARY OF THE INVENTION

The present invention provides a barbecue grill assembly which includes a grate disposed on a second bowl on which charcoal is disposed and the second bowl disposed on a first bowl, the grate having a long tube connected to an under side thereof, the long tube having a U-shaped tunnel defined in an end thereof which is inserted in a central tube extending upwardly from a first bottom of the first bowl, the central tube having two first slots defined diametrically opposite in a periphery of the central tube, the first bowl having a first skirt wherein a second slot is defined, a bolt extending through the second slot, the first slots and the U-shaped tunnel and engaged to a nut, a crank disposed between the first bottom and the bolt so as to adjust a distance from the grate to the second bowl when rotating the crank.

It is an object of the present invention to provide a barbecue grill assembly having a feature of adjusting a distance from the grate to a heat source during grilling.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
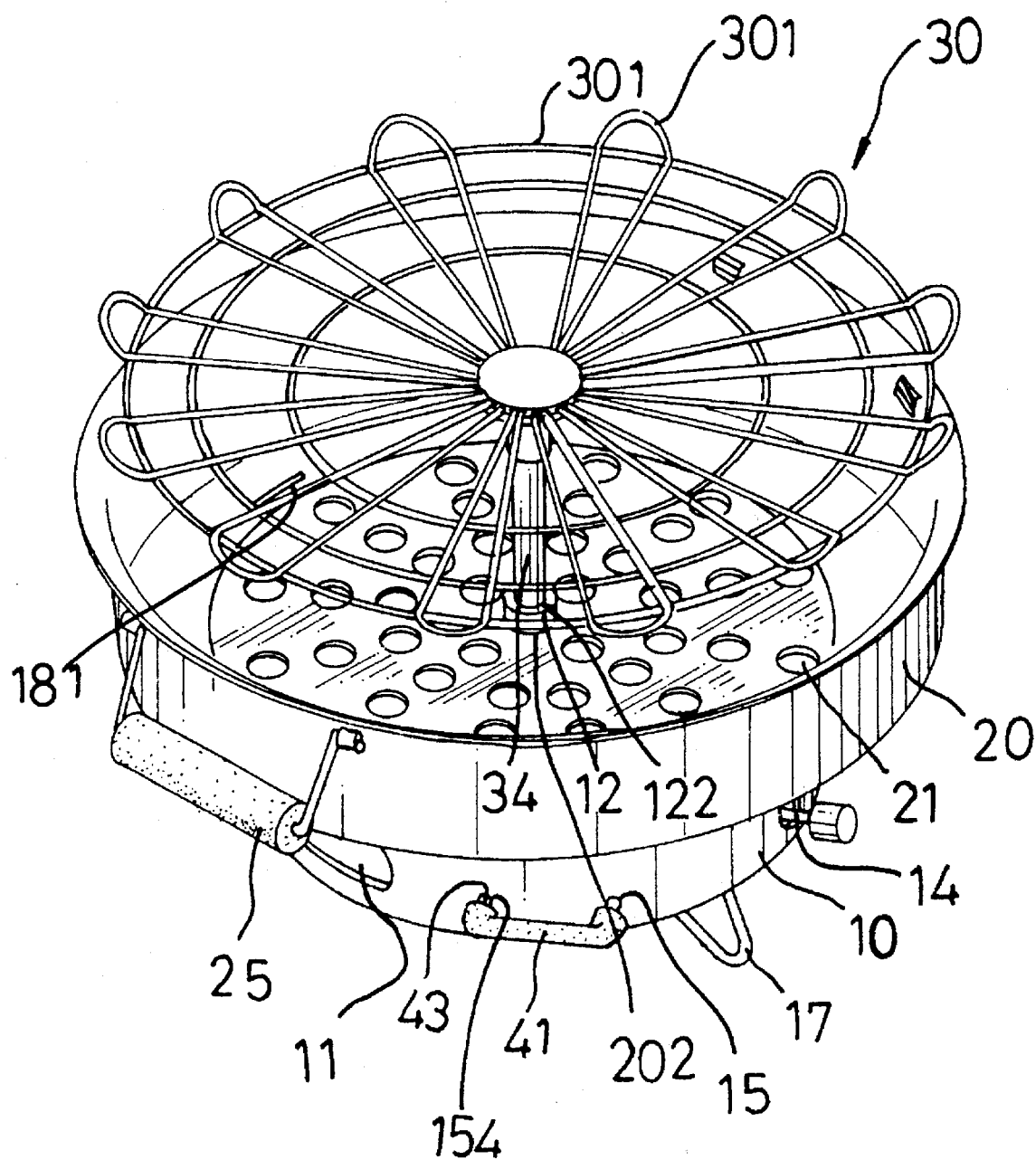
FIG. 1 is a perspective view of a barbecue grill assembly in accordance with the present invention.
Figure 2:
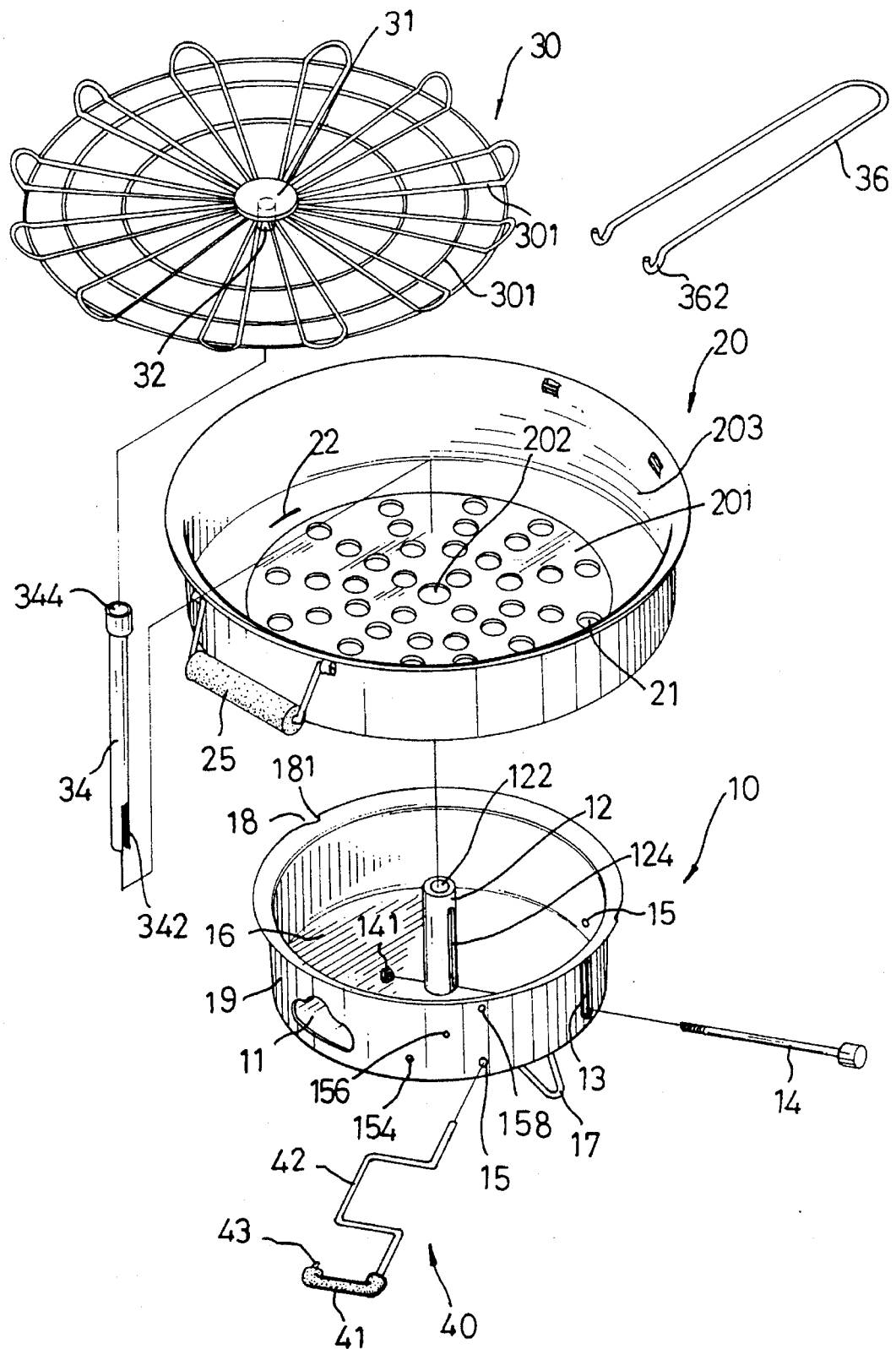
FIG. 2 is an exploded view of the barbecue grill assembly in accordance with the present invention.

Referring to the drawings and initially to FIGS. 1 and 2, a barbecue grill assembly in accordance with the present invention generally includes a first bowl 10, a second bowl 20, a grate 30, a bolt 14 and a crank 40. The first bowl 10 has a first bottom 16 and a first skirt 19, the first skirt 19 extending upwardly from a periphery of the first bottom 16, the first bottom 16 having a central tube 12 extending upwardly therefrom, the central tube 12 having an opening 122 defined in a top thereof and having two first slots 124 longitudinally defined in a periphery thereof and each disposed diametrically opposite in the central tube 12. The first skirt 19 has a second slot 13 defined therein which is in alignment with the first slots 124, two engaging holes 15 defined in the first skirt 19 and arranged such that the second slot 13 is located between the two engaging holes 15, an air inlet 11 defined in the first skirt 19 which has two inclined recesses 18 defined in an upper periphery thereof to form a stop 181. At least three legs 17 extend downwardly from the first bottom 16 of the first bowl 10.

The second bowl 20 for disposal on the first bowl 10 has a second bottom 201 and a second skirt 203 extending from a periphery of the second bottom 201, the second bottom 201 having a central hole 202 defined therein for the central tube 12 extending therethrough, a plurality of vents 21 defined therein, two slits 22 defined in the second bottom 201 and corresponding to the stops 181 of the first bowl 10 and two handle-bars 25 pivotally engaged to an outer periphery of the second skirt 203. The grate 30 has a central surface 31 and a plurality of metal wires 301 to form a screen, the central surface 31 has a stud 32 extending downwardly therefrom.

Figure 3:
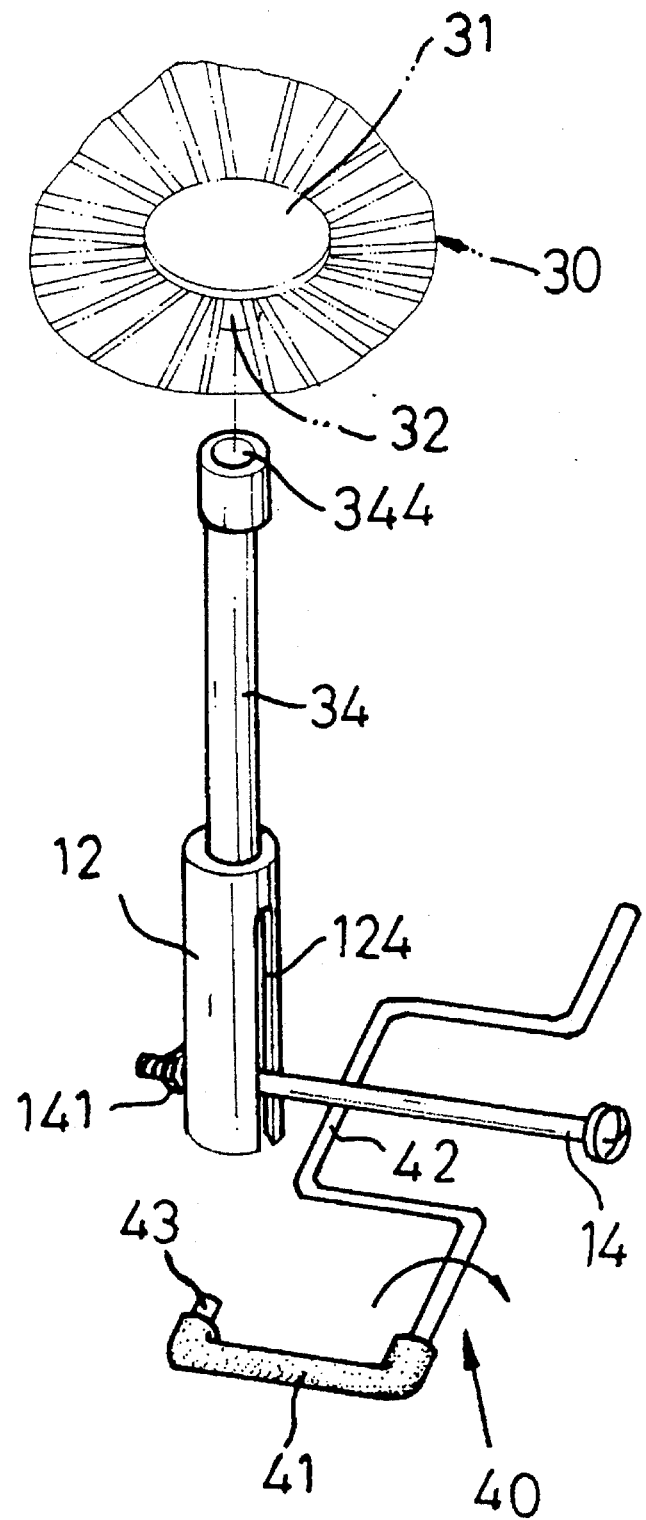
FIG. 3 is an illustrative view of an arrangement of a crank, a bolt and a long tube.

A long tube 34 has a first end and a second end, the first end thereof having a receiving hole 344 defined therein for the stud 32 to be received therein and the second end thereof having a U-shaped tunnel 342 defined therein, said second end thereof inserted in the opening 122 of the central tube 12. The bolt 14 extends through the second slot 13, the first slots 124 and the U-shaped tunnel 342 of the long tube 34 and is engaged to a nut 141. Referring to FIGS. 2 and 3, the crank 40 is rotatably engaged between the two engaging holes 15 of the first skirt 19 and has a handle 41 disposed transversely to an end thereof, the handle 41 having a distal end having a pin 43 extending therefrom and a U-shaped portion 42 formed to a middle portion thereof within the first bowl 10, the U-shaped portion 42 is arranged between the bolt 14 and the first bottom 16 of the first bowl 10. Furthermore, the first skirt 19 has three setting holes 154, 156 and 158 defined therein and arranged in an oblique fashion for the pin 43 of the handle 41 to be respectively inserted therein to set a position of the U-shaped portion 42 of the crank 40.

Figure 4:
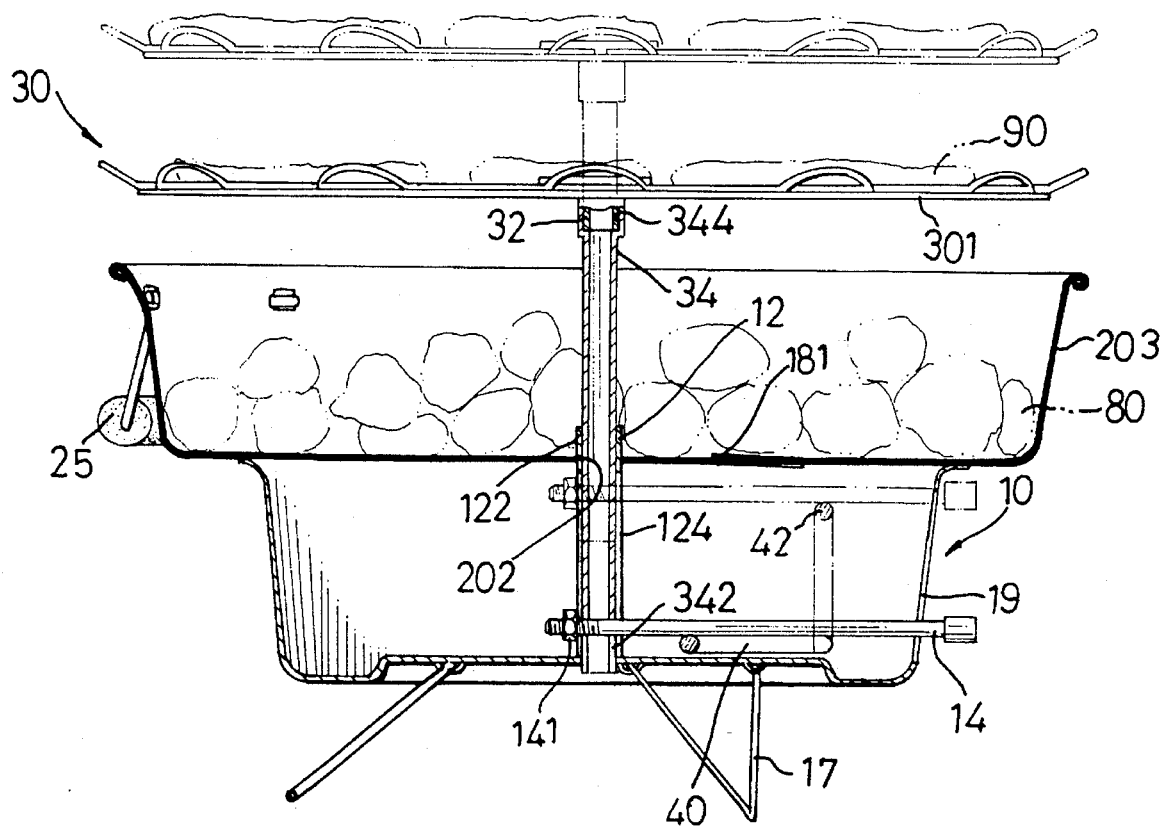
FIG. 4 is a side elevational view, partly in section, of the barbecue grill assembly in accordance with the present invention wherein movements of each of a grate, the crank and the bolt are shown in phantom lines.

Referring now to FIG. 4, when using the barbecue grill assembly, the first bowl 10 stands on the ground by the legs 17 and the second bowl 20 is engaged to the first bowl 10 by extending the central tube 12 through the central hole 202 of the second bowl 20 wherein a plurality of charcoal pieces 80 are put upon the second bottom 201 of the second bowl 20 and the stop 181 inserting into the corresponding slit 22. The grate 30, on which food 90 such as meat or sea food etc. are put, is arranged above the second bowl 20 by extending the stud 32 in the receiving hole 344 of the long tube 34 which is inserted into the opening 122 of the central tube 12 such that the U-shaped tunnel 342 is in alignment with the second slots 124 of the central tube 12 and the first slot 13 of the first skirt 19 so as to be entered by the bolt 14. When rotating the crank 40, the U-shaped portion 42 pushes the bolt 14 upwardly within the first slots 124 of the central tube 12 and the long tube 34 is therefore pushed upwardly by the movement of the bolt 14 to adjust a distance from the second bottom 201 to the grate 30. When the distance is set, the pin 43 of the handle 41 is inserted into one of the setting holes 154, 156 or 158 to fix the crank 40 in position. A U-shaped element 36 has a hook portion 362 formed in each of two distal ends thereof for engagement with the metal wires 301 so as to pick up the grate 30 from the second bowl 20.

Although the invention has been explained in relation to its preferred embodiment, it is to be understood that many other possible modifications and variations can be made without departing from the spirit and scope of the invention as hereinafter claimed.

I claim:

1. A barbecue grill assembly comprising:

a first bowl having a first bottom and a first skirt, said first skirt extending upwardly from a periphery of said first bottom, a central tube extending upwardly from said first bottom and having an opening defined in a top thereof and having two first slots defined in a periphery thereof and each disposed diametrically opposite in said central tube, a second slot defined in said first skirt and in alignment with said first slot and two engaging holes defined in said skirt and arranged such that said second slot is disposed between said two engaging holes;

a second bowl disposed on said first bowl and having a second bottom and a second skirt, said second bottom having a central hole defined therein for said central tube extending therethrough and a plurality of vents defined therein;

a grate having a central surface, said central surface having a stud extending downwardly therefrom;

a long tube having a first end and a second end, said first end thereof having a receiving hole defined therein for said stud to be inserted therein and said second end thereof having a U-shaped tunnel defined therein, said second end thereof inserted in said central tube and a bolt passing through said first slot, said second slots and said U-shaped tunnel and engaged to a nut, and a crank rotatably engaged between said two engaging holes of said first skirt and having a handle and a U-shaped portion, said U-shaped portion disposed between said bolt and said first bottom of said first bowl.

2. The barbecue grill assembly as claimed in claim 1 wherein said first bowl has an air inlet defined in said first skirt thereof.

3. The barbecue grill assembly as claimed in claim 1 wherein said first bowl has at least two inclined recesses defined in an upper periphery of said first skirt thereof to form a stop said second bowl has at least two slits defined in said second bottom thereof such that said stop engages with said slit when said second bowl disposed on said first bowl.

4. The barbecue grill assembly as claimed in claim 1 wherein said handle of said crank has a pin extending therefrom and said first skirt having a plurality of setting holes defined therein for said pin to be inserted to set said crank in position.

* * * * *